United States Patent
Wu et al.

(10) Patent No.: US 9,372,802 B2
(45) Date of Patent: Jun. 21, 2016

(54) DATA WRITING METHOD, HARD DISC MODULE, AND DATA WRITING SYSTEM

(71) Applicant: Acer Incorporated, New Taipei (TW)

(72) Inventors: Po-Wei Wu, New Taipei (TW); Ta-Wei Chang, New Taipei (TW); Hsung-Pin Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 94 days.

(21) Appl. No.: 14/295,359

(22) Filed: Jun. 4, 2014

(65) Prior Publication Data

US 2015/0058553 A1 Feb. 26, 2015

(30) Foreign Application Priority Data

Aug. 22, 2013 (TW) .............................. 102130004 A

(51) Int. Cl.
*G06F 12/08* (2006.01)

(52) U.S. Cl.
CPC ........ *G06F 12/0888* (2013.01); *G06F 12/0873* (2013.01); *G06F 2212/1016* (2013.01); *G06F 2212/1036* (2013.01); *G06F 2212/217* (2013.01); *G06F 2212/2146* (2013.01); *G06F 2212/222* (2013.01); *G06F 2212/224* (2013.01); *G06F 2212/7208* (2013.01)

(58) Field of Classification Search
CPC ............ G06F 12/0888; G06F 12/0873; G06F 2212/2146; G06F 2212/1016; G06F 2212/1036; G06F 2212/217; G06F 2212/222; G06F 2212/224; G06F 2212/7208

See application file for complete search history.

(56) References Cited

U.S. PATENT DOCUMENTS

| 5,724,552 A * | 3/1998 | Taoda | G06F 3/061 707/999.202 |
| 2010/0113582 A1* | 5/2010 | Ghosh | A61K 31/366 514/450 |
| 2011/0196833 A1* | 8/2011 | Drobychev | G06F 17/30082 707/634 |
| 2013/0198230 A1* | 8/2013 | Ochi | H04L 67/1097 707/770 |
| 2014/0317056 A1* | 10/2014 | Kim | G06F 17/30581 707/634 |

FOREIGN PATENT DOCUMENTS

TW 201042640 12/2010

* cited by examiner

*Primary Examiner* — Hiep Nguyen
(74) *Attorney, Agent, or Firm* — Jianq Chyun IP Office

(57) ABSTRACT

A data writing method, a hard disc module, and a data writing system for writing data into the hard disc module are provided, wherein the hard disc module includes a plurality of memory units. The data writing method includes the following steps. A cache data is received and a data class of the cache data is determined. If the data class of the cache data belongs to a first type, the cache data is distributed and written to the memory units. If the data class of the cache data belongs to a second type, the cache data is written to one of the memory units.

16 Claims, 4 Drawing Sheets

DATA WRITING METHOD, HARD DISC MODULE, AND DATA WRITING SYSTEM

CROSS-REFERENCE TO RELATED APPLICATION

This application claims the priority benefits of Taiwan application serial no. 102130004, filed on Aug. 22, 2013. The entirety of the above-mentioned patent application is hereby incorporated by reference herein and made a part of this specification.

BACKGROUND

1. Field of the Invention

The present invention is directed to a cache technique and more particularly, to a data writing method, a hard disc module and a data writing system.

2. Description of Related Art

At present, mass storage devices that are available in the market can be divided into hard driver disks (HDD) composed of heads and discs and solid state disks (SSD) composed of memories. Generally, a hard driver disk (HDD) has lower production cost and thus, typically has a larger storage capacity than a solid state disk (SSD). However, as for data access speed, the SSD has data access speed several times higher than data access speed of the HDD. Therefore, more and more computer systems adopt hybrid hard disc architecture of the SSHD, in which a HDD serves as a basic data storage space, and the SSD serves as a cache space.

In a conventional hybrid hard disc architecture, a memory of the SSD is commonly formed by a plurality of memory units, and in order to increase data access speed, a single set of data may be divided into a plurality of data segments for simultaneous accessing operation through each of the memory units. Even though such a parallelized access operation can increase the read speed, more fragmented spaces are produced in the memory units since the data is divided and written into different memory units, and each of the memory units merely stores a portion of the data segments. As a result, when the storage space of the memory is insufficient, but a garbage collection operation has to be performed for memory management, the memory has high write amplification factors (WAF) to reduce the lifespan of the SSD.

Accordingly, how to effectively take both the high data access speed and the lifespan of the SSD is a major subject when developing products to the manufacturers in the field.

SUMMARY

The present invention is directed to a data writing method, a hard disc module and a data writing system, by which different writing methods are provided according to a data class of cache data so as to effectively increase data access speed and prolong the lifespan of the hard disc module.

The present invention provides a data writing method for a hard disc module. The hard disc module includes a plurality of memory units, and the data writing method includes the following steps. A cache data is received, and a data class of the cache data is determined. If the data class of the cache data belongs to a first type, the cache data is distributed and written into the memory units. If the data class of the cache data belongs to a second type, the cache data is written into one of the memory units.

The present is further directed to a hard disc module including a memory controller and a plurality of memory units. Each of the memory units is coupled to the memory controller via a data channel. The memory controller receives a cache data, determines a data class of the cache data, distributes and writes the cache data into the memory units if the data class of the cache data belongs to a first type and writes the cache data into one of the memory units if the data class of the cache data belongs to a second type.

The present invention is yet further directed to a data writing system including a host and a first hard disc module. The first hard disc module is coupled to the host and includes a memory controller and a plurality of memory units. Each of the memory units is coupled to the memory controller via a data channel. The memory controller receives a cache data from the host and determines a data class of the cache data. If the data class of the cache data belongs to a first type, the memory controller distributes and writes the cache data into the memory units. If the data class of the cache data belongs to a second type, the memory controller writes the cache data into one of the memory units.

Based on the above, by the data writing method, the hard disc module and the data writing system of the present invention, the cache data may be distributed and written into a plurality of memory units, or alternatively, the cache data may be written into the same memory unit according to the data class of the cache data, such that the data access speed can be effectively increased, and the lifespan of the hard disc module can be prolonged.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

BRIEF DESCRIPTION OF THE DRAWINGS

In a solid state hybrid drive (SSHD), a cache data with a high access frequency is commonly cached to a solid state disk (SSD) so as to enhance data access speed of overall computer system by utilizing the high data access speed characteristics of the SSD. Nevertheless, based on a degree of usage frequency, the cache data accessing the SSD may further be classified into performance-orientated cache data and reliability-orientated cache data, in which the performance-orientated cache data requires a higher data access speed. If the SSD is capable of writing the cache data by different writing methods according to the data class of the cache data, both the data access speed and the lifespan of the SSD may be taken into consideration. Accordingly, the present invention proposes a data writing method, a hard disc module and a data writing system in light of the aforementioned perspectives. In order to make the content of the present invention more comprehensible, the following embodiments are illustrated as examples that can be truly implemented by the present invention.

Figure 1:
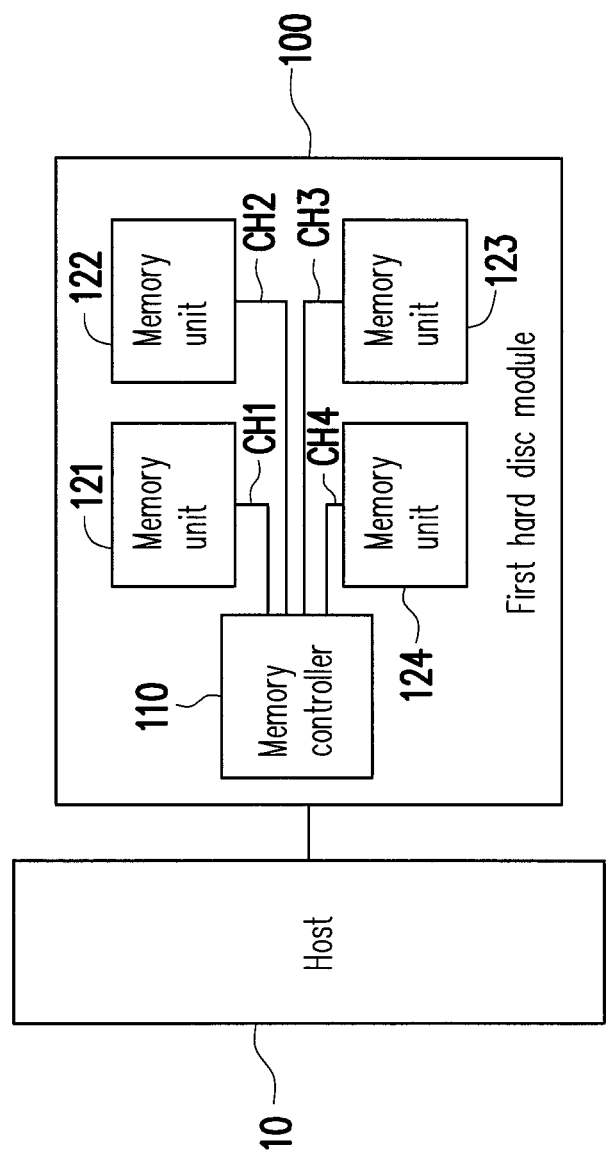
FIG. 1 is a block diagram illustrating a data writing system according to an embodiment of the present invention.

FIG. 1 is a block diagram illustrating a data writing system according to an embodiment of the present invention. With reference to FIG. 1, a data writing system 1000 includes a host 10 and a first hard disc module 100.

The host 10 is, for example, a desktop computer, a notebook computer, a tablet computer, a personal digital assistant (PDA), a mobile phone, a digital camera, a game machine or any electronic device with computing and processing capabilities, of which the type is not limited in the present invention. Additionally, the host 10 includes an operation system and a central processing unit (CPU) to manage hardware and software resources of the host 10.

The first hard disc module 100 may serve as a cache space for storing and placing various types of cache data. The first hard disc module 100 is, for example, a flash memory storage device (e.g., a solid state disk (SSD)) using a flash memory as a storage medium. Additionally, the first hard disc module 100 may be disposed inside the host 10 and electrically connected with the host 10. Alternatively, the first hard disc module 100 may also be electrically connected with the host 10 through external connection, such as through a universal serial bus (USB) or any other type of bus, which is not limited in the present invention.

The first hard disc module 100 includes a memory controller 110 and a plurality of memory units. For descriptive convenience, memory units 121, 122, 123 and 124 are illustrated herein as examples, but the number of the memory units is not limited in the present embodiment.

The memory controller 110 may be implemented by a system on chip (SOC) which is configured to execute a plurality of logic gates or control instructions implemented in a hardware form or a firmware form and perform operations, such as data writing, data reading and data erasing, in the memory units 121, 122, 123 and 124 according to instructions from the host 10. Herein, the memory controller 110 writes data into the memory units 121, 122, 123 and 124 according to a data writing method of the present embodiment. Additionally, the memory controller 110 maintains a logical to physical address mapping table to record a mapping relationship between logical addresses and physical addresses of the cache data. When the host 10 is about to access a logical address, the memory controller 110 may access data from the memory units 121, 122, 123 and 124 from according to the logical to physical address mapping table.

Each of the memory units 121, 122, 123 and 124 is, for example, a single level cell (SLC) NAND flash memory, a multi level cell (MLC) NAND flash memory, a trinary level cell (TLC) NAND flash memory or any other flash memory with the same characteristics. Specifically, each memory cell in the SLC NAND flash memory can store one bit of data (i.e., "1" or "0"), each memory cell in the MLC NAND flash memory can store two bits of data, and each memory cell in the TLC NAND flash memory can store three bits of data. The memory units 121, 122, 123 and 124 are coupled to the memory controller 110 respectively via data channels CH1, CH2, CH3 and CH4, and each of the memory units 121, 122, 123 and 124 has a plurality of physical blocks to store data written by the host 10. Each of the physical blocks has a plurality of physical pages, and the physical pages belonging to the same physical blocks may be independently written and simultaneously erased.

In the present embodiment, when the first hard disc module 100 receives a cache data from the host 10, the memory controller 110 determines a data class of the cache data. If the cache data is extremely weighted on read speed (i.e., a performance-oriented cache data), such as an executable file of a windows application, the memory controller 110 writes the cache data into the different memory units 121, 122, 123 and 124 via the different data channels CH1, CH2, CH3 and CH4 so as to carry out high data access speed performance of the first hard disc module 100. On the other hand, if the cache data is not extremely weighted on the read speed (i.e., a reliability-oriented cache data) or the cache data has a file size over a default value (e.g., 128 KB), the memory controller 110 writes the cache data into one of the memory units via one of the data channels so as to prolong the lifespan and improve the reliability for the first hard disc module 100.

Figure 2:
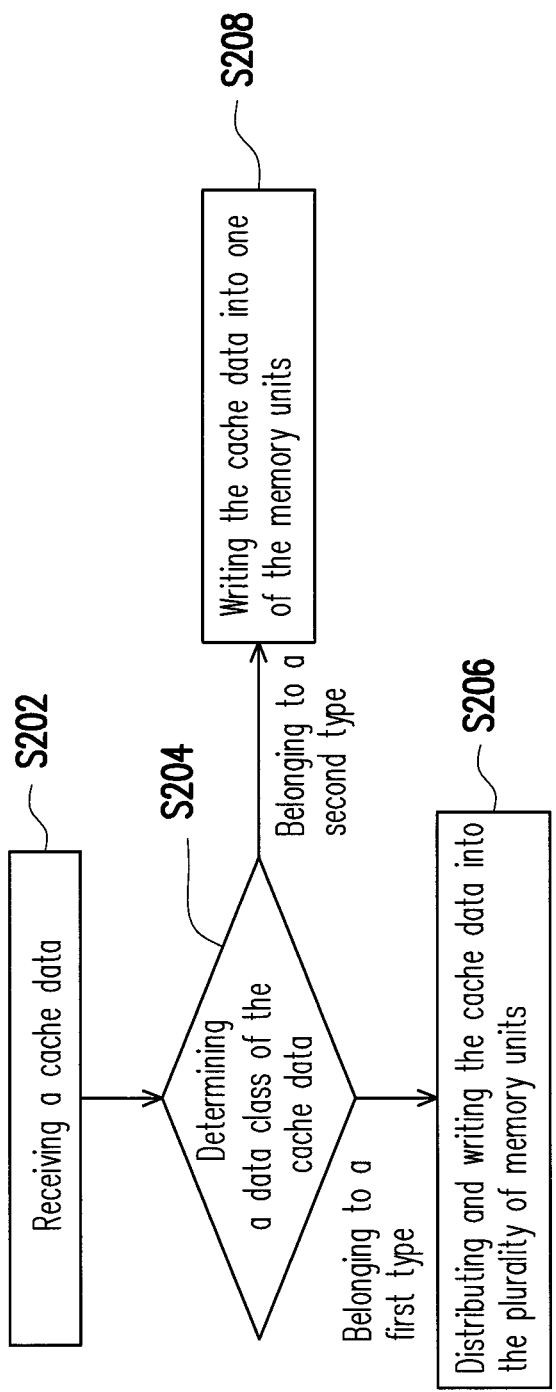
FIG. 2 is a flowchart of a data writing method according to an embodiment of the present invention.

Each step of a data writing method of the present embodiment will be described with the operation of the data writing system 1000 below. FIG. 2 is a flowchart of a data writing method according to an embodiment of the present invention. With reference to FIG. 1 and FIG. 2, in step S202, the memory controller 110 receives a cache data. In step S204, the memory controller 110 determining a data class of the cache data. Specifically, the data class of the cache data is classified into a first type and a second type according to a writing method for the cache data to be written into the memory units 121, 122, 123 and 124. Namely, the memory controller 110 distributes and writes the cache data belonging to the first type into the memory units 121, 122, 123 and 124, while the memory controller 110 writes the cache data belonging to the second type into one of the memory units 121, 122, 123 and 124. In the present embodiment, the cache data belonging to the first type is, for example, a performance-orientated cache data that is extremely weighted on the read speed, while the cache data belonging to the second type is, for example, a reliability-oriented cache data that is not extremely weighted on the read speed.

It should be mentioned that the host 10 may set the data class of the cache data to be the first type or the second type so as to set which type of the cache data is to be distributed and written by the memory controller 110 into the different memory units 121, 122, 123 and 124, or which type of the cache data is to be written by the memory controller 110 into the same memory unit. For instance, the host 10 may set the data class of the cache data according to a file type, a file size, a usage frequency of the cache data. For example, if the cache data is an executable file of a windows application, the host 10 sets the cache data to be the first type, and if the cache data is a document file (e.g., a file with a format of *.docx, *.pdf or *.xlsx) of a user, the host 10 sets the cache data to be the second type since the document file has less probability to be continuously opened. Moreover, if the file size of the cache data is not over 128 KB, the host 10 sets the cache data to be the first type, and if the file size of the cache data is over 128 KB, the host 10 sets the cache data to be the second type. Certainly, the host 10 may also set the cache data that is extremely weighted on the read speed to be the first type and set the cache data that is not extremely weighted on the read speed to be the second type based on the user's setting. The method for setting the data class of the cache data is merely illustrated as an example, and the present invention is not limited thereto.

In the present embodiment, the host 10 may set the data class of the cache data by marking different flag values in a predetermined bit of the cache data according to the file type, the file size and the usage frequency of the cache data. By doing so, the memory controller 110 may determine whether the data class of the cache data belongs to the first type or the second type according to a flag value in a predetermined bit of the cache data. For instance, if the host 10 sets the flag value in the predetermined bit of the cache data to be a first value, e.g., "0", the memory controller 110 determines that the data class of the cache data is the first type. On the other hand, if the host 10 sets the flag value in the predetermined bit of the cache data to be a second value, e.g., "1", the memory controller 110 determines that the data class of the cache data is the second type. It is to be understood that the flag value of the present embodiment is not limited to "0" or "1", and the memory controller 110 may also determine whether the data class of the cache data is the first type or the second type according to any other state marked in the cache data.

Then, in step S204, if the memory controller 110 determines that the data class of the cache data belongs to the first type, referring to step S206, the memory controller 110 distributes and writes the cache data into the memory units 121, 122, 123 and 124. In this case, the memory controller 110 obtains a plurality of first physical addresses corresponding to a plurality of logical addresses (e.g., logical block addresses (LBA) for the cache data according to the logical to physical address mapping table. The first physical addresses respectively belong to the different memory units 121, 122, 123 and 124. Meanwhile, the memory controller 110 writes a plurality of data segments of the cache data, which is corresponding to the logical addresses, into the different memory units 121, 122, 123 and 124 according to the first physical addresses via the data channels CH1, CH2, CH3 and CH4, respectively.

For instance, Table 1 below is a logical to physical address mapping table illustrating a mapping relationship between the logical addresses and the first physical addresses. With reference to Table 1, it is assumed that the data segments of the cache data respectively correspond to logical addresses L(100), L(101), L(102) and L(103), and the logical addresses L(100), L(101), L(102) and L(103) are respectively mapped to first physical addresses P(201), P(301), P(401) and P(501). The first physical addresses P(201), P(301), P(401) and P(501) sequentially belong to the memory units 121, 122, 123 and 124. Here, the memory controller 110 respectively writes the data segments located in the logical addresses L(100), L(101), L(102) and L(103) in to the memory units 121, 122, 123 and 124 according to the first physical addresses P(201), P(301), P(401) and P(501). In other words, if a file size of the cache data is 10 MB, the memory controller 110 divides the cache data into 4 sets of data, each of which has a file size of, for example, 2.5 MB or, alternatively, has a different file size. Meanwhile, the memory controller 110 respectively writes the 4 sets of data into the memory units 121, 122, 123 and 124. Accordingly, according to the concept of data distribution, the memory controller 110 may write the cache data into the different memory units 121, 122, 123 and 124 respectively via the data channels CH1, CH2, CH3 and CH4 in a rapid and parallelized way. Moreover, when the host 10 is about to read the cache data in the first hard disc module 100, the memory controller 110 may read in parallel each of the data segments of the cache data distributed in the memory units 121, 122, 123 and 124 through each of the data channels CH1, CH2, CH3 and CH4. Thereby, the speed for the memory controller 110 to access the cache data may be increased.

TABLE 1

| Logical addresses | First physical addresses |
|---|---|
| L(100) | P(201) |
| L(101) | P(301) |
| L(102) | P(401) |
| L(103) | P(501) |

It should be mentioned that in step S204, the present invention is not to limit the cache data to be written into all the memory units of the first hard disc module 100. That is, any method that respectively writes the data segments of the cache data written into two or more memory units of the first hard disc module 100 falls within the scope of the present invention. Additionally, in order to increase the speed of accessing the cache data, the memory controller 110 may distribute the cache data to a plurality of memory units of the first hard disc module 100, evenly or unevenly, according to the number of the memory units.

On the other hand, if the memory controller 110 determines that the data class of the cache data belongs to the second type, referring to step S208, the memory controller 110 writes the cache data into one of the memory units 121, 122, 123 and 124. In this case, the memory controller 110 obtains a plurality of second physical addresses corresponding to a plurality of logical addresses of the cache data according to a logical to physical address mapping table. The second physical addresses belong to one of the memory units 121, 122, 123 and 124 (e.g., represented by a memory unit P). The memory controller 110 writes a plurality of data segments of the cache data into the memory unit P according to the second physical addresses.

For instance, Table 2 is a logical to physical address mapping table illustrating a mapping relationship between the logical addresses and the first physical addresses. With reference to Table 2, it is assumed that the data segments of the cache data respectively correspond to the logical addresses L(100), L(101), L(102) and L(103), and the logical addresses L(100), L(101), L(102) and L(103) are respectively mapped to second physical addresses P(201), P(202), P(203) and P(204). Additionally, it is also assumed that all the second physical addresses P(201), P(202), P(203) and P(204) belong to the memory units 121. Herein, the memory controller 110 writes the data segments located in the logical addresses L(100), L(101), L(102) and L(103) in to the memory units 121 according to the second physical addresses P(201), P(202), P(203) and P(204). In other words, if a file size of the cache data is 10 MB, the memory controller 110 entirely writes 10 MB of the cache data into the memory units 121. By doing so, the cache data may be continuously and completely written into the same memory unit, and thus, for first hard disc module 100, fragmented spaces may be prevented from being produced therein and the frequency and cost for garbage collection (GC) may be reduced. Accordingly, in the present embodiment, the erase counts of the memory cells in the first hard disc module 100 may be reduced, and write amplification factors (WAF) may be effectively suppressed so as to prolong the lifespan of the first hard disc module 100 and improve the reliability of the first hard disc module 100.

TABLE 2

| Logical addresses | Second physical addresses |
|---|---|
| L(100) | P(201) |
| L(101) | P(202) |
| L(102) | P(203) |
| L(103) | P(204) |

In light of the foregoing, according to the data class of the cache data, the memory controller 110 may utilize different methods to divide the cache data belonging to the first type (e.g., the performance-oriented cache data) and write the divided cache data into the memory units 121, 122, 123 and 124, and write the cache data belonging to the second type (e.g., the reliability-oriented cache data) into the same memory unit, respectively. Accordingly, the first hard disc module 100 may provide higher data access speed when accessing the performance-orientated cache data and effectively suppress the WAF when accessing the reliability-oriented cache data. Thus, in the present embodiment, both the data access speed and the lifespan of the first hard disc module 100 may be taken into consideration.

Figure 3:
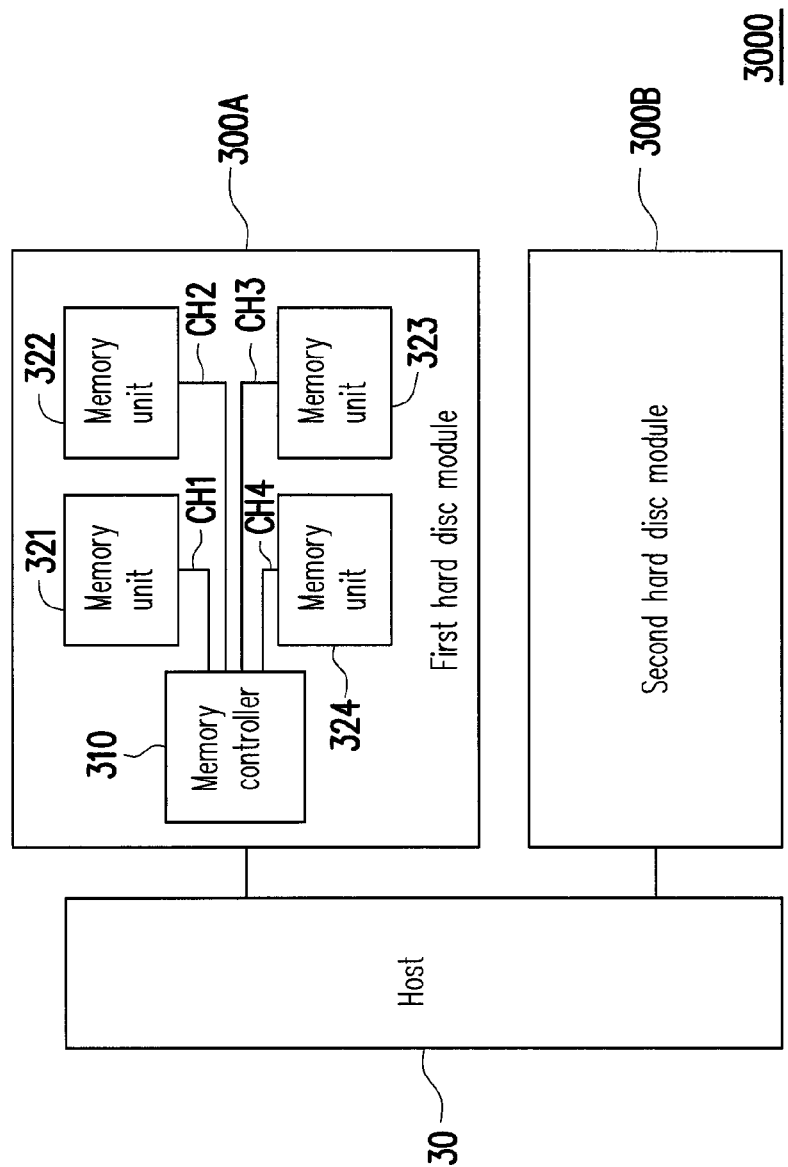
FIG. 3 is a block diagram illustrating a data writing system according to an embodiment of the present invention.

FIG. 3 is a block diagram illustrating a data writing system according to an embodiment of the present invention. With reference to FIG. 3, a data writing system 3000 includes a host 30, a first hard disc module 300A and a second hard disc module 300B. A data access speed of the first hard disc module 300A is higher than that of the second hard disc module 300B. In the present embodiment, the host 30 and the first hard disc module 300A have functions that are the same or similar to the host 10 and the first hard disc module 100 in the aforementioned embodiment, and will not be repeatedly described hereinafter.

Differing from the aforementioned embodiment, in the present embodiment, the data writing system 3000 is further equipped with a second hard disc module 300B. The second hard disc module 300B is, for example, a disc storage unit (e.g., hard disk drive (HDD)) using a disc as a storage medium. Additionally, the second hard disc module 300B and the first hard disc module 300A may be integrated as a data storage device (e.g., a solid state hybrid drive (SSHD)) which is combined by two or more storage media having different data access speeds for the user to store various types of data. In the present embodiment, due to the data access speed of the first hard disc module 300A being higher that that of the second hard disc module 300B, the first hard disc module 300A may serve as a cache space for storing and placing various types of cache data, while the second hard disc module 300B may serve as a basic storage space for storing most data.

Figure 4:
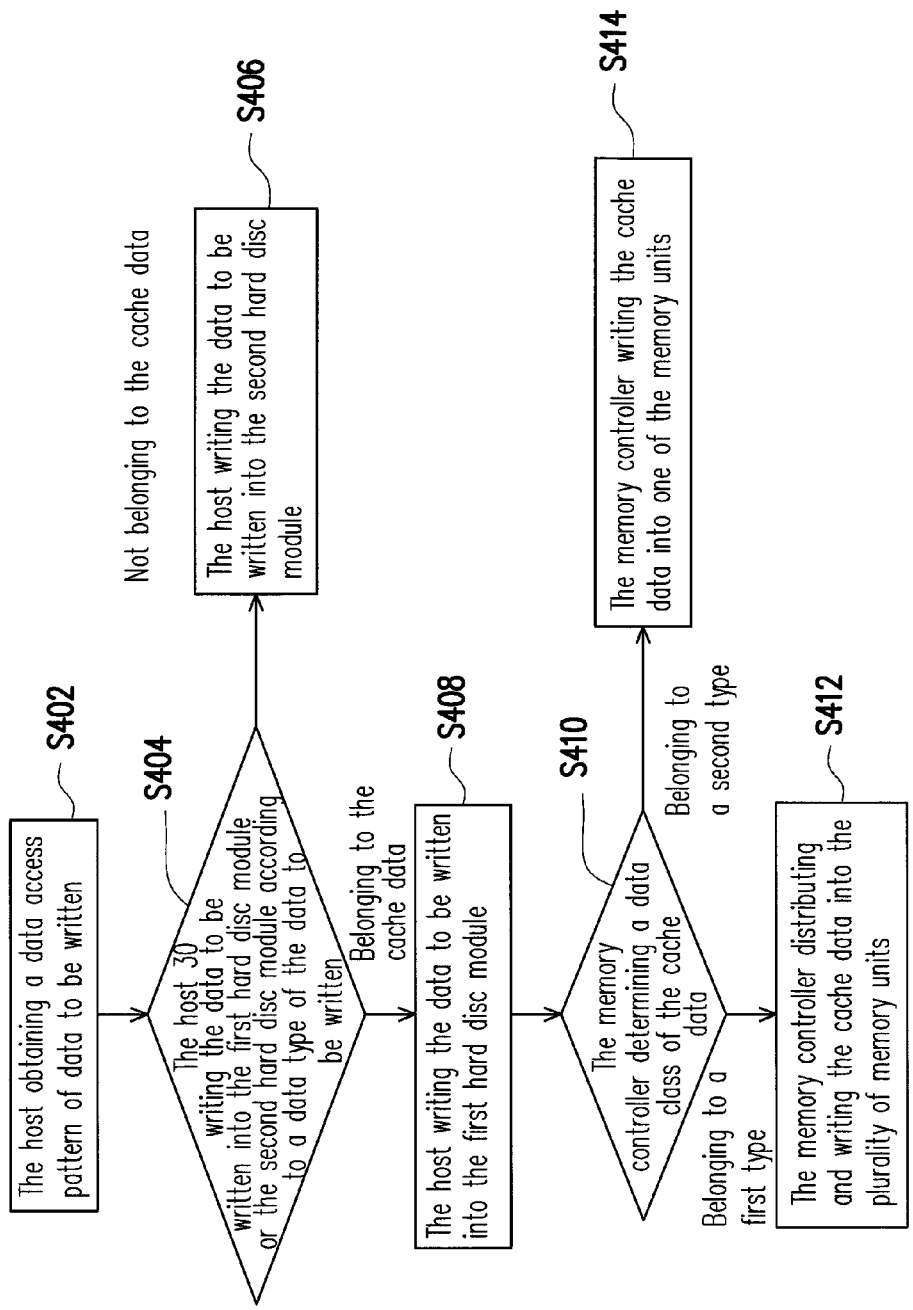
FIG. 4 is a flowchart of a data writing method according to an embodiment of the present invention.

Each step of a data writing method of the present embodiment will be described with the operation of the data writing system 3000 below. FIG. 4 is a flowchart of a data writing method according to an embodiment of the present invention. With reference to FIG. 3 and FIG. 4, in step S402, the host 30 receives a data access pattern of data to be written. The host 30 determines whether the data access pattern of the data to be written belongs to a cache data having the higher data access speed according to, for example, a file type, a file size, a usage frequency or a write instruction of the data to be written. In step S404, the host 30 writes the data to be written into the first hard disc module 300A or the second hard disc module 300B according to a data type of the data to be written. If the data to be written does not belong to the cache data, referring to step S406, the host 30 writes the data to be written into the second hard disc module 300B. Here, the second hard disc module 300B may provide a larger storage space so as to satisfy the user's demand on the storage capacity.

On the other hand, if the data to be written belongs to the cache data, referring to step S408, the host 30 writes the data to be written into the first hard disc module 300A so as to provide the higher data access speed. Then, in step S410, the memory controller 310 of the first hard disc module 300A determines a data class of the cache data. Meanwhile, if the memory controller 310 determines that the data class of the cache data belongs to a first type, referring to step S412, the memory controller 410 distributes and writes the cache data into memory units 421, 422, 423 and 424. On the other hand, if the memory controller 310 determines that the data class of the cache data belongs to a second type, referring to step S414, the memory controller 410 writes the cache data into one of the memory units 421, 422, 423 and 424. Steps S408 through S414 and steps S202 through S208 in the aforementioned embodiment are the same or similar, which will not be repeatedly described hereinafter.

In the present embodiment, the host 30 is capable of properly and selectively writing the data to be written into the first hard disc module 300A or the second hard disc module 300B, so as to carry out advantages of different types of hard disc modules. Moreover, the first hard disc module 300A may further classify the data to be written so as to distributively write the data into the different memory units 421, 422, 423 and 424 or one of the memory units 421, 422, 423 and 424 of the first hard disc module 300A. Thus, in the present embodiment, both the data access speed and the increase of the lifespan of the first hard disc module 300A may be taken into consideration.

To sum up, in the data writing method, the hard disc module and the data writing system of the present embodiment, the host writes the cache data into the hard disc module using a memory as a storage medium according to the data access pattern of the data to be written. The memory controller of the hard disc module may further determine whether the cache data belongs to the performance-oriented (i.e., the first type) cache data or the reliability-oriented (i.e., the second type) cache data according to the data class of the cache data. Meanwhile, the memory controller utilizes the concept of data distribution to write the cache data belonging to the performance-orientated into the different memory units and write the cache data belonging to the reliability-oriented type into the same memory unit. Accordingly, the hard disc module may provide a higher data access speed when accessing the performance-orientated cache data and effectively suppress the WAF when accessing the reliability-oriented cache data. Thus, the present invention can take both the data access speed and the lifespan of the hard disc module into consideration.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data writing method for a hard disc module, wherein the hard disc module comprises a plurality of memory units, the data writing method comprising:
   receiving a cache data;
   determining a data class of the cache data;
   if the data class of the cache data belongs to a first type, distributing and writing the cache data into the memory units; and
   if the data class of the cache data belongs to a second type, writing the cache data into one of the memory units, so as to suppress a write amplification factor of the hard disc module in response to accessing the cache data written into the one of the memory units.

2. The data writing method according to claim 1, wherein the step of determining the data class of the cache data comprises:
   determining the data class of the cache data according to a flag value;
   if the flag value belongs to a first value, determining that the cache data belongs to the first type; and
   if the flag value belongs to a second value, determining that the cache data belongs to the second type.

3. The data writing method according to claim 2, wherein the flag value is determined based on a file type, a file size or a usage frequency of the cache data.

4. The data writing method according to claim 1, wherein the step of distributing and writing the cache data into the memory units if the data class of the cache data belongs to the first type comprises:
obtaining a plurality of first physical addresses corresponding to a plurality of logical addresses of the cache data according to a logical to physical address mapping table, wherein the first physical addresses belong to the different memory units; and
writing a plurality of data segments of the cache data into the memory units according to the first physical addresses.

5. The data writing method according to claim 1, wherein the step of writing the cache data into one of the memory units if the data class of the cache data belongs to the second type comprises:
obtaining a plurality of second physical addresses corresponding to a plurality of logical addresses of the cache data according to a logical to physical address mapping table, wherein the second physical addresses belong to one of the memory units; and
writing a plurality of data segments of the cache data into the one of the memory units according to the second physical addresses.

6. A hard disc module, comprising:
a memory controller; and
a plurality of memory units, wherein each of the memory units is coupled to the memory controller via a data channel,
wherein the memory controller receives a cache data, determines a data class of the cache data, distributes and writes the cache data into the memory units if the data class of the cache data belongs to a first type and writes the cache data into one of the memory units if the data class of the cache data belongs to a second type, so as to suppress a write amplification factor of the hard disc module in response to accessing the cache data written into the one of the memory units.

7. The hard disc module according to claim 6, wherein the memory controller determines the data class of the cache data according to a flag value, determines that the cache data belongs to the first type if the flag value belongs to the first value and determines that the cache data belongs to the second type if the flag value belongs to a second value.

8. The hard disc module according to claim 7, wherein the flag value is determined based on a file type, a file size, a usage frequency or a default value of the cache data.

9. The hard disc module according to claim 6, wherein if the data class of the cache data belongs to the first type, the memory controller obtains a plurality of first physical addresses corresponding to a plurality of logical addresses of the cache data according to a logical to physical address mapping table, wherein the first physical addresses belong to the different memory units, and the memory controller writes a plurality of data segments of the cache data into the memory units according to the first physical addresses.

10. The hard disc module according to claim 6, wherein if the data class of the cache data belongs to the second type, the memory controller obtains a plurality of second physical addresses corresponding to a plurality of logical addresses of the cache data according to a logical to physical address mapping table, wherein the second physical addresses belong to one of the memory units, and the memory controller writes a plurality of data segments of the cache data into the one of the memory units according to the second physical addresses.

11. A data writing system, comprising:
a host; and
a first hard disc module, coupled to the host and comprising a memory controller and a plurality of memory units, wherein each of the memory units is coupled to the memory controller via a data channel, the memory controller receives a cache data from the host, determines a data class of the cache data, distributes and writes the cache data into the memory units if the data class of the cache data belongs to a first type, and writes the cache data into one of the memory units if the data class of the cache data belongs to a second type, so as to suppress a write amplification factor of the first hard disc module in response to accessing the cache data written into the one of the memory units.

12. The data writing system according to claim 11, wherein the memory controller determines the data class of the cache data according to a flag value, determines that the cache data belongs to the first type if the flag value belongs to the first value and determines that the cache data belongs to the second type if the flag value belongs to a second value.

13. The data writing system according to claim 12, wherein the flag value is determined based on a file type, a file size, a usage frequency or a default value of the cache data.

14. The data writing system according to claim 11, wherein if the data class of the cache data belongs to the first type, the memory controller obtains a plurality of first physical addresses corresponding to a plurality of logical addresses of the cache data according to a logical to physical address mapping table, wherein the first physical addresses belong to the different memory units, and the memory controller writes a plurality of data segments of the cache data into the memory units according to the first physical addresses.

15. The data writing system according to claim 11, wherein if the data class of the cache data belongs to the second type, the memory controller obtains a plurality of second physical addresses corresponding to a plurality of logical addresses of the cache data according to a logical to physical address mapping table, wherein the second physical addresses belong to one of the memory units, and the memory controller writes a plurality of data segments of the cache data into the one of the memory units according to the second physical addresses.

16. The data writing system according to claim 11, further comprising:
a second hard disc module, coupled to the host and having a data access speed lower than a data access speed of the first hard disc module, wherein the host determines whether a data access pattern of data to be written belongs to the cache data, writes the data to be written into the first hard disc module if the data to be written belongs to the cache data and writes the data to be written into the second hard disc module if the data to be written does not belong to the cache data.

* * * * *